United States Patent
Chen

(10) Patent No.: US 12,438,566 B2
(45) Date of Patent: Oct. 7, 2025

(54) WIRELESS SIGNAL RECEIVING DEVICE AND SYSTEM

(71) Applicant: GETAC TECHNOLOGY CORPORATION, New Taipei (TW)

(72) Inventor: Kuan-Yu Chen, Taipei (TW)

(73) Assignee: GETAC TECHNOLOGY CORPORATION (TW)

( * ) Notice: Subject to any disclaimer, the term of this patent is extended or adjusted under 35 U.S.C. 154(b) by 458 days.

(21) Appl. No.: 17/960,021

(22) Filed: Oct. 4, 2022

(65) Prior Publication Data

US 2023/0118715 A1    Apr. 20, 2023

Related U.S. Application Data

(60) Provisional application No. 63/255,866, filed on Oct. 14, 2021.

(51) Int. Cl.
*H04B 1/00* (2006.01)
*H04B 1/16* (2006.01)
(Continued)

(52) U.S. Cl.
CPC ............ *H04B 1/18* (2013.01); *H04B 1/0057* (2013.01); *H04B 1/0064* (2013.01); *H04B 1/16* (2013.01);
(Continued)

(58) Field of Classification Search
CPC ...... H04B 1/18; H04B 1/0057; H04B 1/0064; H04B 1/16; H04B 1/3805; H04B 2001/3811; Y02D 30/70
See application file for complete search history.

(56) References Cited

U.S. PATENT DOCUMENTS 8,200,287 B2    6/2012    Kushida et al.
8,730,103 B2    5/2014    Chaudhary et al.
(Continued)

FOREIGN PATENT DOCUMENTS

CN    101304580 A    11/2008
CN    103560801 A    2/2014
(Continued)

OTHER PUBLICATIONS

Pei Zhao et al., "Indoor wireless communication technology and engineering practice principles." Beijing University of Posts and Telecommunications Press, p. 203, 2015.
(Continued)

*Primary Examiner* — Joseph E Dean, Jr.
(74) *Attorney, Agent, or Firm* — Andy M. Han; Han IP PLLC

(57) ABSTRACT

A wireless signal receiving device and system are provided. The wireless signal receiving system includes a wireless signal receiving device and a Global Position System (GPS) module. The wireless signal receiving device includes an antenna for receiving first wireless signals in a plurality of frequency bands, a first filter coupled to the antenna for splitting the first wireless signals in the plurality of frequency bands into wireless signals in different frequency bands, and a second filter coupled to the first filter for compositing the wireless signals in the different frequency bands into second wireless signals having a plurality of frequency bands. The GPS module is coupled to the wireless signal receiving device. The GPS module is for receiving the second wireless signals having the plurality of frequency bands.

10 Claims, 1 Drawing Sheet

(51) Int. Cl.
*H04B 1/18* (2006.01)
*H04B 1/3805* (2015.01)

(52) U.S. Cl.
CPC .... *H04B 1/3805* (2013.01); *H04B 2001/3811* (2013.01)

(56) References Cited

U.S. PATENT DOCUMENTS

| | | |
|---|---|---|
| 10,505,700 B1 | 12/2019 | Lan et al. |
| 12,228,655 B1 | 2/2025 | MacGougan et al. |
| 2002/0107033 A1 | 8/2002 | Kim |
| 2003/0008660 A1 | 1/2003 | Forrester |
| 2003/0125001 A1 | 7/2003 | Kushihi |
| 2006/0121870 A1 | 6/2006 | Chu |
| 2006/0152408 A1 | 7/2006 | Leinonen et al. |
| 2008/0055172 A1 | 3/2008 | Chen |
| 2011/0024976 A1 | 2/2011 | Imae |
| 2011/0249760 A1 | 10/2011 | Chrisikos et al. |
| 2012/0202561 A1* | 8/2012 | Robinett ............ H04B 1/006 455/552.1 |
| 2012/0243447 A1 | 9/2012 | Weissman et al. |
| 2018/0123632 A1 | 5/2018 | Posselt et al. |
| 2019/0036461 A1 | 1/2019 | Bohmer et al. |
| 2019/0364612 A1 | 11/2019 | Lan et al. |
| 2020/0024440 A1 | 1/2020 | DeRocher et al. |
| 2020/0132855 A1 | 4/2020 | Lee et al. |
| 2020/0244408 A1 | 7/2020 | Kim et al. |
| 2021/0135690 A1* | 5/2021 | Pehlke ................ H04B 1/0078 |

FOREIGN PATENT DOCUMENTS

| | | |
|---|---|---|
| CN | 104092526 A | 10/2014 |
| CN | 105655713 A | 6/2016 |
| CN | 106033840 A | 10/2016 |
| CN | 106100686 A | 11/2016 |
| CN | 106330220 A | 1/2017 |
| CN | 106450757 A | 2/2017 |
| CN | 106877914 A | 6/2017 |
| CN | 108233948 A | 6/2018 |
| CN | 108832988 A | 11/2018 |
| CN | 109756238 A | 5/2019 |
| CN | 112164893 A | 1/2021 |
| CN | 112714415 A | 4/2021 |
| KR | 20050028688 A | 3/2005 |
| KR | 100895795 B1 | 4/2009 |
| TW | 201611410 A | 3/2016 |
| WO | WO2017071331 A1 | 5/2017 |

OTHER PUBLICATIONS

Yu, "Application of Integrated Audio Front-End in Medium and Shortwave Transmitting Stations", China Broadnet Technical Communication, Dec. 31, 2024, pp. 149-154.

* cited by examiner

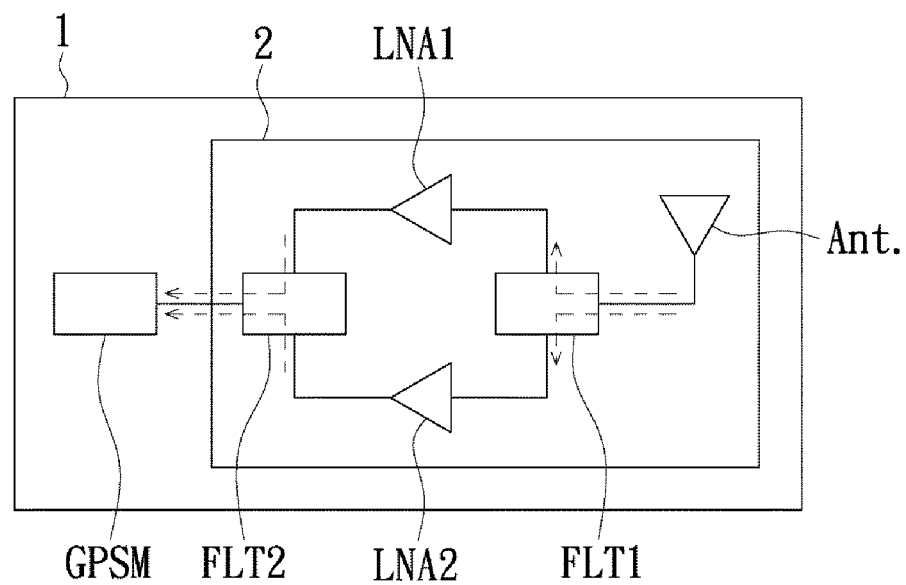

WIRELESS SIGNAL RECEIVING DEVICE AND SYSTEM

The application claims priority to U.S. Provisional Application No. 63/255,866, filed on Oct. 14, 2021, the disclosure of which is hereby incorporated by reference herein in its entirety.

BACKGROUND OF THE INVENTION

Field of the Invention

The present invention relates to a wireless signal receiving device and system and, more particularly, to a wireless signal receiving device and system used to receive wireless signals in a plurality of frequency bands by a single antenna and enhance the quality of wireless signals fed into a system.

Description of the Prior Art

Regarding applications of the Global Positioning System (GPS) in the industry, wireless signals in the L5 frequency band are newly added apart from wireless signals in the original L1 frequency band. Due to the newly added wireless signals in the L5 frequency band, the GPS provides a lower positioning error and an improved precision.

In general, when an antenna receives wireless signals, noise is received in addition to wireless signals in desired frequency bands. In particular, wireless signals need to be processed if wireless signals including a plurality of frequency bands are all received once, so as to prevent the noise from entering a system. In case of excess noise included in the wireless signals, the performance of the system may be degraded by the influences of the noise.

Regarding a scenario wherein wireless signals in a plurality of frequency bands are received by using one single antenna, the market currently lacks a product that is capable of filtering out noise from the wireless signals in the multiple frequency bands so as to ensure the quality of the wireless signals in the multiple frequency bands.

SUMMARY OF THE INVENTION

In view of the issue above, the present invention provides a wireless signal receiving device and system capable of first splitting wireless signals in a plurality of frequency bands and then individually filtering out noise from the split wireless signals, and compositing and feeding the wireless signals from which the noise has been filtered out into a Global Positioning System (GPS) module for further use. While ensuring the quality of wireless signals in the plurality of frequency bands, because wireless signals in different frequency bands do not need to be received using multiple antennas, technical effects of saving the number of required antennas and reducing the space needed by the antennas during circuit design can be achieved.

A wireless signal receiving device provided according to the present invention includes: an antenna, for receiving first wireless signals in a plurality of frequency bands; a first filter, coupled to the antenna, for splitting the first wireless signals in the plurality of frequency bands into wireless signals in different frequency bands; and a second filter, coupled to the first filter, for compositing the wireless signals in the different frequency bands into second wireless signals having a plurality of frequency bands.

In one embodiment of the present invention, the wireless signal receiving device above further includes: a first low-noise amplifier (LNA), coupled to the first filter and the second filter, for receiving third wireless signals in one single frequency band; and a second LNA, coupled to the first filter and the second filter, for receiving fourth wireless signals in one single frequency band.

A wireless signal receiving system provided according to the present invention includes: a wireless signal receiving device, including an antenna for receiving first wireless signals in a plurality of frequency bands, a first filter coupled to the antenna and for splitting the first wireless signals in the plurality of frequency bands into wireless signals in different frequency bands, and a second filter coupled to the first filter and for compositing the wireless signals in the different frequency bands into second wireless signals having a plurality of frequency bands; and a Global Position System (GPS) module, coupled to the wireless signal receiving device and for receiving the second wireless signals in the plurality of frequency bands.

In one embodiment of the present invention, the wireless signal receiving device of the wireless signal receiving system above further includes: a first low-noise amplifier (LNA), coupled to the first filter and the second filter, for receiving third wireless signals in one single frequency band; and a second LNA, coupled to the first filter and the second filter, for receiving fourth wireless signals in one single frequency band.

In one embodiment of the present invention, in the wireless signal receiving system and the wireless signal receiving device above, the first filter splits the first wireless signals in the plurality of frequency bands into the third wireless signals in the one single frequency band and the fourth wireless signals in the one single frequency band.

In one embodiment of the present invention, in the wireless signal receiving system and the wireless signal receiving device above, the first wireless signals in the plurality of frequency bands and the second wireless signals in the plurality of frequency bands include wireless signals of the GPS.

In one embodiment of the present invention, in the wireless signal receiving system and the wireless signal receiving device above, the third wireless signals in the one single frequency band are wireless signals in the L1 frequency band of the GPS, and the fourth wireless signals in the one single frequency band are wireless signals in the L5 frequency band of the GPS.

To better understand the above and other objects, features and advantages of the present invention, preferred embodiments are described in detail with the accompanying drawings below.

BRIEF DESCRIPTION OF THE DRAWINGS

FIG. 1 is a block diagram of a wireless signal receiving system provided according to an embodiment of the present invention.

DETAILED DESCRIPTION OF THE EMBODIMENTS

Refer to FIG. 1 showing a block diagram of a wireless signal receiving system provided according to an embodiment of the present invention.

In this embodiment, a wireless signal receiving system 1 of the present invention includes an antenna Ant., a first filter FLT1, a second filter FLT2, a first low-noise amplifier (LNA) LNA1, a second LNA LNA2, and a Global Positioning System (GPS) module GPSM. A wireless signal receiving device 2 consists of the antenna Ant., the first filter FLT1, the second filter FLT2, the first LNA LNA1, and the second LNA LNA2. The first filter FLT1 is coupled to the antenna Ant., the second filter FLT2 is coupled to the first filter FLT1, the first LNA LNA1 is coupled between the first filter FLT1 and the second filter FLT2, the second LNA LNA2 is coupled between the first filter FLT1 and the second filter FLT2, and the GPS module GPSM is coupled to the wireless signal receiving device 2.

The wireless signal receiving system 1 of the present invention can receive first wireless signals in a plurality of frequency bands by the antenna Ant., split the first wireless signals in the plurality of frequency bands into wireless signals in different frequency bands (for example, third wireless signals in one single frequency band fourth wireless signals in one single frequency band) by the first filter FLT1, perform noise filtering and power amplification on the wireless signals in the different frequency bands by the first LNA LNA1 and the second LNA LNA2, respectively, composite the wireless signals in the different frequency bands having undergone noise filtering and power amplification into second wireless signals having a plurality of frequency bands by the second filter FLT2, and feed the second wireless signals having the plurality of frequency bands into the GPS module GPSM for further use, so as to ensure the quality of the wireless signals in the plurality of frequency bands fed into the GPS module GPSM.

In the wireless signal receiving system 1, the antenna Ant. is one single antenna for receiving the first wireless signals in the plurality of frequency bands. For example, the antenna Ant. can be used to receive the first wireless signals in the plurality of frequency bands including the L1 frequency band and the L5 frequency band of the GPS. Since the antenna Ant. can receive wireless signals including the plurality of frequency bands, the wireless signals in different frequency bands do not need to be respectively received by using multiple antennas. Moreover, because the present invention adopts a functional structure that does not use multiple antennas, the number of antennas required can be saved, reducing the space occupied by antennas during circuit design. In general, for a circuit including multiple antennas, reception effects of each antenna at different positions with respect to wireless signals need to be tested, and the position of an antenna can severely affect the reception quality of the wireless signals. However, the present invention uses only one single antenna, and thus the time needed for testing during circuit development can be further saved, and only an optimal reception position for the one single antenna needs to be determined for the current design.

In the wireless signal receiving system 1 of the present invention, the first filter FLT1 is coupled to the antenna Ant. and the second filter FLT2, and splits the first wireless signals in the plurality of frequency bands received by the antenna Ant. into wireless signals in different frequency bands. For example, the first filter FLT1 can split the first wireless signals in the plurality of frequency bands received by the antenna Ant. into third wireless signals in one single frequency band and fourth wireless signals in one single frequency band. In one embodiment, the third wireless signals in the one single frequency band are wireless signals in the L1 frequency band of the GPS, and the fourth wireless signals in the one single frequency band are wireless signals in the L5 frequency band of the GPS. By splitting the first wireless signals in the plurality of frequency bands received by the antenna Ant., signal processing such as noise filtering and signal amplification can be individually performed on the split wireless signals, and the wireless signals having undergone the signal processing are then output to the second filter FLT2.

In the wireless signal receiving system 1 of the present invention, the first LNA LNA1 is coupled between the first filter FLT1 and the second filter FLT2, and is used to receive, after the first wireless signals in the plurality of frequency bands received by the antenna Ant. are split into the third wireless signals in the one single frequency band and the fourth wireless signals in the one single frequency band by the first filter FLT1, the third wireless signals in the one single frequency band, perform signal processing of noise filtering and signal amplification on the third wireless signals in the one single frequency band, and then output the wireless signals having undergone the signal processing to the second filter FLT2. Since the first LNA LNA1 can perform signal processing of noise filtering and signal amplification on the third wireless signals in the one single frequency band, the signal sensitivity of the wireless signal receiving system 1 can be enhanced. That is to say, the wireless signal receiving device 2 can correctly receive the first wireless signals in the plurality of frequency bands having smaller powers for the use of the wireless signal receiving system 1. At the same time, the first LNA LNA1 is also capable of effectively reducing the overall noise figure (NF) of the wireless signal receiving system 1, achieving a better signal reception effect.

In the wireless signal receiving system 1 of the present invention, the second LNA LNA2 is coupled between the first filter FLT1 and the second filter FLT2, and is used to receive, after the first wireless signals in the plurality of frequency bands received by the antenna Ant. are split into the third wireless signals in the one single frequency band and the fourth wireless signals in the one single frequency band by the first filter FLT1, the fourth wireless signals in the one single frequency band, perform signal processing of noise filtering and signal amplification on the fourth wireless signals in the one single frequency band, and then output the wireless signals having undergone the signal processing to the second filter FLT2. Since the second LNA LNA2 can perform signal processing of noise filtering and signal amplification on the fourth wireless signals in the one single frequency band, the signal sensitivity of the wireless signal receiving system 1 can be enhanced. That is to say, the wireless signal receiving device 2 can correctly receive the first wireless signals in the plurality of frequency bands having smaller powers for the use of the wireless signal receiving system 1. At the same time, the second LNA LNA2 is also capable of effectively reducing the overall noise figure of the wireless signal receiving system 1, achieving a better signal reception effect.

In the wireless signal receiving system 1 of the present invention, the second filter FLT2 is coupled to the first filter FLT1 and is coupled to the first LNA LNA1 and the second LNA LNA2, and is used to composite the wireless signals in the different frequency bands into the second wireless signals having the plurality of frequency bands. In one embodiment, the wireless signal receiving system 1 can receive the first wireless signals in the plurality of frequency bands including the L1 frequency band and the L5 frequency band of the GPS by the antenna Ant., split the first wireless signals in the plurality of frequency bands into the third wireless signals in the L1 frequency band of the GPS and the fourth wireless signals in the L5 frequency band of the GPS by the first filter FLT1, perform signal processing of noise filtering and power amplification on the third wireless signals in the L1 frequency band of the GPS and the fourth wireless signals in the L5 frequency band of the GPS by the first LNA LNA1 and the second LNA LNA2, respectively, composite the third wireless signals in the L1 frequency band of the GPS and the fourth wireless signals in the L5 frequency band of the GPS having undergone the signal processing into the second wireless signals having the plurality of frequency bands including the L1 frequency band and the L5 frequency band of the GPS by the second filter FLT2, and feed the second wireless signals having the plurality of frequency bands into the GPS module GPSM for use, so as to ensure the quality of the second wireless signals having the plurality of frequency bands fed into the GPS module GPSM. It should be noted that, although a combiner and a filter can both be used for signal composition, considering that the power loss of a filter is lower in comparison with that of a combiner and to increase the quality of the wireless signals fed into the system, the second filter FLT2 of the present invention cannot be replaced by a combiner.

In the wireless signal receiving system 1 of the present invention, the GPS module GPSM is coupled to the wireless signal receiving device 2, and is used to receive the second wireless signals having the plurality of frequency bands. In one embodiment, the GPS module GPSM is a GPS module in form of a single-feed module; that is to say, the GPS module GPSM can only be applied to receive one wireless signal but cannot be used to respectively receive wireless signals in different frequency bands.

In conclusion, the present invention provides a wireless signal receiving device and system capable of first splitting wireless signals in a plurality of frequency bands and then individually filtering out noise from the split wireless signals, and compositing and feeding the wireless signals from which the noise has been filtered out into a GPS module for further use. While ensuring the quality of wireless signals in the plurality of frequency bands, because wireless signals in different frequency bands do not need to be received using multiple antennas, technical effects of saving the number of required antennas and reducing the space needed by the antennas during circuit design can be achieved.

The present invention is disclosed as the embodiments above. However, these embodiments are not to be construed as limitations to the present invention. Slight modifications and variations may be made to the embodiments by a person skilled in the art without departing from the spirit and scope of the present invention. Therefore, the scope of legal protection of the present invention shall be defined by the appended claims.

What is claimed is:

1. A wireless signal receiving device for a Global Positioning System (GPS), comprising:
   an antenna, for receiving first wireless signals in a plurality of frequency bands;
   a first filter, coupled to the antenna, for splitting the first wireless signals in the plurality of frequency bands received by the antenna into wireless signals in different frequency bands; and
   a second filter, coupled to the first filter, for compositing the wireless signals in the different frequency bands output by the first filter into second wireless signals having a plurality of frequency bands.

2. The wireless signal receiving device according to claim 1, wherein the first filter splits the first wireless signals in the plurality of frequency bands into third wireless signals in one single frequency band and fourth wireless signals in one single frequency band.

3. The wireless signal receiving device according to claim 1, wherein the first wireless signals in the plurality of frequency bands and the second wireless signals in the plurality of frequency bands comprise wireless signals of the GPS.

4. The wireless signal receiving device according to claim 2, further comprising:
   a first low-noise amplifier (LNA), coupled to the first filter and the second filter, for receiving the third wireless signals in the one single frequency band; and
   a second LNA, coupled to the first filter and the second filter, for receiving the fourth wireless signals in the one single frequency band.

5. The wireless signal receiving device according to claim 2, wherein the third wireless signals in the one single frequency band are wireless signals in an L1 frequency band of the GPS, and the fourth wireless signals in the one single frequency band are wireless signals in an L5 frequency band of the GPS.

6. A wireless signal receiving system, comprising:
   a wireless signal receiving device for a Global Positioning System (GPS), comprising:
     an antenna, for receiving first wireless signals in a plurality of frequency bands;
     a first filter, coupled to the antenna, for splitting the first wireless signals in the plurality of frequency bands received by the antenna into wireless signals in different frequency bands; and
     a second filter, coupled to the first filter, for compositing the wireless signals in the different frequency bands output by the first filter into second wireless signals having a plurality of frequency bands; and
   a GPS module, coupled to the wireless signal receiving device, for receiving the second wireless signals having the plurality of frequency bands.

7. The wireless signal receiving system according to claim 6, wherein the first filter splits the first wireless signals in the plurality of frequency bands into third wireless signals in one single frequency band and fourth wireless signals in one single frequency band.

8. The wireless signal receiving system according to claim 6, wherein the first wireless signals in the plurality of frequency bands and the second wireless signals in the plurality of frequency bands comprise wireless signals of the GPS.

9. The wireless signal receiving system according to claim 7, wherein the wireless signal receiving device further comprises:
   a first low-noise amplifier (LNA), coupled to the first filter and the second filter, for receiving the third wireless signals in the one single frequency band; and
   a second LNA, coupled to the first filter and the second filter, for receiving the fourth wireless signals in the one single frequency band.

10. The wireless signal receiving system according to claim 7, wherein the third wireless signals in the one single frequency band are wireless signals in an L1 frequency band of the GPS, and the fourth wireless signals in the one single frequency band are wireless signals in an L5 frequency band of the GPS.

* * * * *